Oct. 4, 1960　　　　　C. W. LINDER　　　　2,954,930
TEMPERATURE RESPONSIVE VALVE
Filed Nov. 24, 1958　　　　　　　　　　2 Sheets-Sheet 1
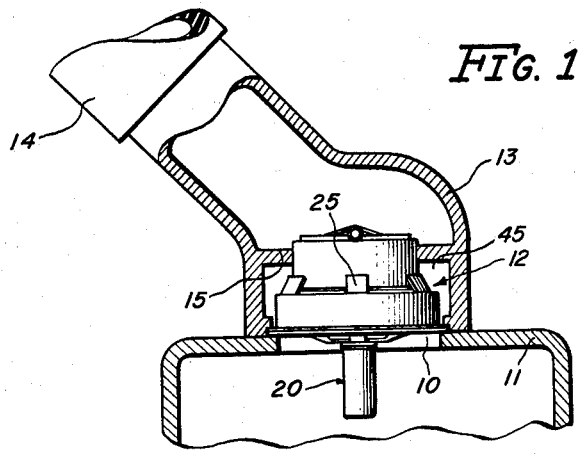
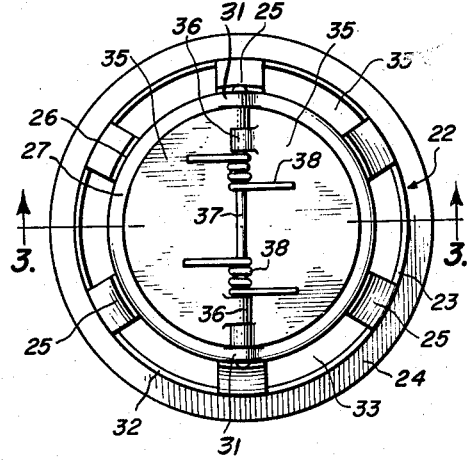
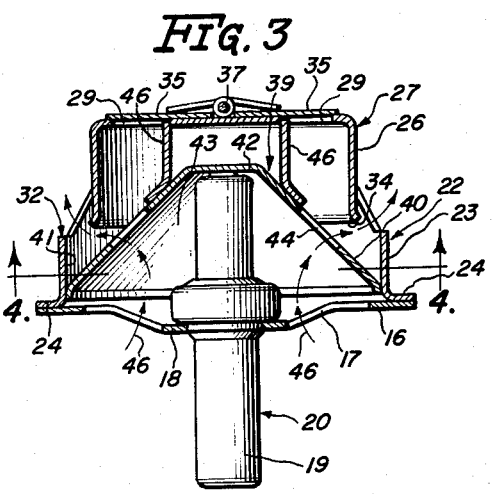
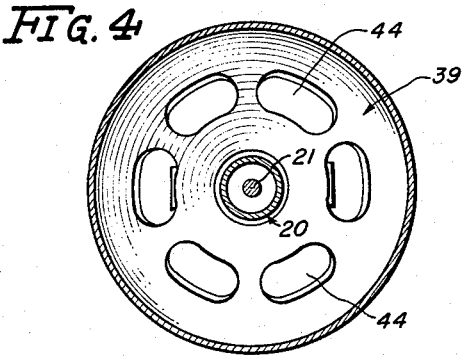
INVENTOR
Carl W. Linder
Paul O. Pippel
ATTORNEY

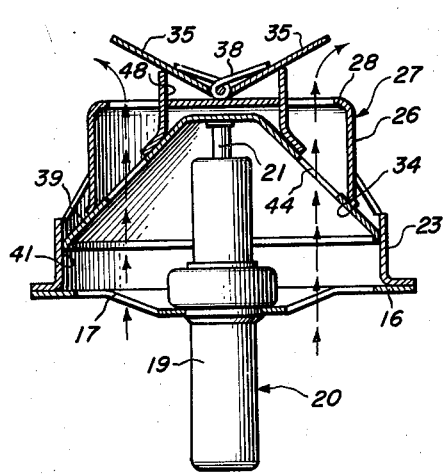
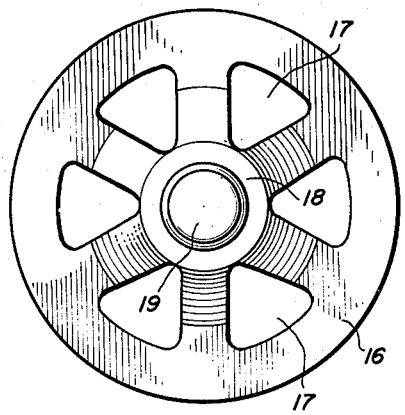
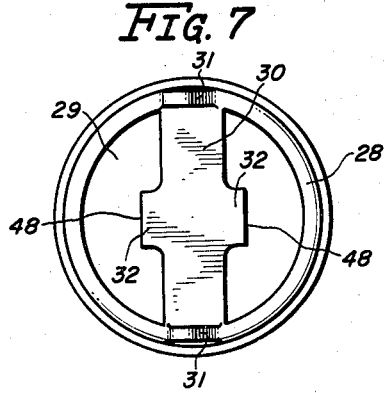
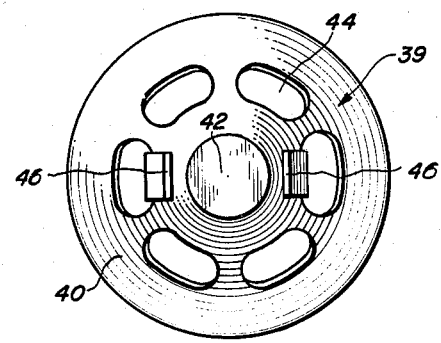
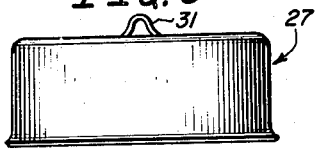
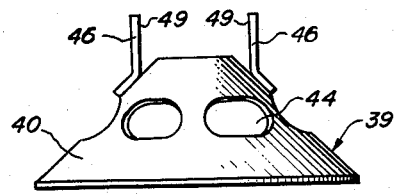

United States Patent Office 2,954,930
Patented Oct. 4, 1960

2,954,930

TEMPERATURE RESPONSIVE VALVE

Carl W. Linder, Fort Wayne, Ind., assignor to International Harvester Company, Chicago, Ill., a corporation of New Jersey Filed Nov. 24, 1958, Ser. No. 775,965

11 Claims. (Cl. 236—34.5)

This invention relates to a temperature responsive valve and more particularly to a thermo-statically controlled valve mechanism for regulating the flow of coolant circulating in the cooling system of an internal combustion engine to thereby control the operating temperature of the engine.

An important object of the present invention is to provide a novel temperature responsive valve structure adapted to control the coolant flow discharge from the engine whereby circulation of coolant through the heat exchanger or radiator is permitted when the coolant is at a predetermined temperature corresponding to the proper operating temperature of the engine and to bypass the radiator and permit fluid to flow directly from the engine to the suction side of the coolant circulating pump when the temperature of the coolant is below a predetermined value.

A further object is to provide a temperature responsive valve device which is simple and compact in design and construction and thus economical to manufacture and install and which will automatically control the engine temperature in an efficient manner.

The foregoing and other important objects and desirable features inherent in and encompassed by the invention, together with many of the purposes and uses thereof, will become readily apparent from a reading of the ensuing description in conjunction with the annexed drawings in which:

Fig. 1 is a fragmentary side elevational view, partly in section, of a portion of an internal combustion engine having the subject matter of the invention incorporated therein;

Fig. 2 is a plan view of the temperature responsive valve unit;

Fig. 3 is a sectional view taken substantially along line 3—3 of Fig. 2 showing the various parts of the temperature responsive valve unit in one operational condition;

Fig. 4 is a sectional view taken substantially along line 4—4 of Fig. 3;

Fig. 5 is a sectional view similar to Fig. 3 with the exception that the various parts of the temperature responsive valve unit are in a different operational condition;

Fig. 6 is a bottom plan view of the valve structure part for supporting the temperature responsive element;

Fig. 7 is a top plan view of a part of the temperature responsive valve unit and the part is shown disassociated from the other components of the valve unit;

Fig. 8 is a top plan view of another part of the valve unit and is also shown disassociated from the other parts of the valve unit;

Fig. 9 is a side elevational view of the valve part shown in Fig. 7; and

Fig. 10 is a side elevational view of the valve part shown in Fig. 8.

Referring to the drawings in detail wherein like reference characters represent like elements throughout the various views, a temperature responsive valve structure embodying the invention is shown mounted over a circular discharge opening 10 formed through a wall of a cylinder head casting 11 of an internal combustion engine (not shown). The thermostatically controlled valve unit designated generally by numeral 12 is positioned over the opening 10 and is clamped and sealed on the engine between the head casting 11 and a fitting 13 by any suitable means such as attaching bolts or the like (not shown). A flexible hose 14 is fastened to the open end of the fitting 13. The hose 14 leads to a radiator, not shown, and is secured thereto in a well known manner. As shown in Figure 1 fitting 13 is provided with a radially inwardly projecting annular flange 15, the purpose of which will be pointed out hereinafter.

The thermo-responsive valve unit 12 includes a circular plate-like support member 16, illustrated in Figure 6. The support member 16 is preferably made of sheet metal and a plurality of circumferentially spaced triangularly-shaped openings 17 are punched therethrough. The center portion of the support member 16 is depressed to provide an annular central portion 18. The central portion 18 has an aperture therethrough through which the body 19 of a thermostatic element 20 extends. The thermostaatic element 20 is secured to the support member 16 by any suitable means. The thermostatic element 20 may be of any conventional type which includes a stem 21 reciprocal within the body 20 between a contracted position, as shown in Figure 3, wherein the stem is substantially enclosed by the body 20 in an expanded position as shown in Figure 5 where a portion of the stem projects from one end of the body 20. As in the operation of thermostatic elements the stem 21 is in its expanded position whenever the temperature of the coolant in which the body 19 is immersed reaches a predetermined temperature and conversely the stem 21 is in its contracted position when the temperature of the coolant is below or falls below a second predetermined temperature.

The temperature responsive valve unit 12 also includes a sheet metal member 22. The member 22 is formed with a generally cylindrical section 23 which has a radially extending flange 24 formed on one end thereof which is adapted thereagainst the outer periphery of the support member 16 and be secured thereto. The annual flange defined by the radially extending flange 24 and the outer periphery of the support member 16 is clamped and sealed on the engine between the head casting 11 and the cutting 13 when the fitting 13 is attached to the engine. Extending radially inwardly and upwardly as viewed in Figure 3 from the end of the cylindrical section 23 opposite the flange 24 are a plurality of circumferentially spaced integrally formed struts 25. The free end of the struts 25 are suitably secured to a depending, cylindrical section 26 of an inverted cup-shaped cap member 27. The top wall 28 of the cap member 27 is formed with a pair of symmetrical semicircular openings 29 therethrough as best shown in Figure 7 which openings 29 are separated by a diametrically extending bar 30. The top wall portions 31 at each end of the bar 30 are offset vertically with respect to the general plane of the top wall 28 as shown in Figure 9 to provide pivot pin bearing. It will be noted that the cylindrical section 26 of the cap member 27 is radially spaced inwardly from the cylindrical section 23 of the member 22. Thus each pair of adjacent struts 25, the edge portion 32 of the cylindrical section 23 extending therebetween, and the wall portion of the cylindrical section 26 extending between the free ends of each pair of adjacent struts 25 define an opening 33. When the fitting 33 is attached to the internal combustion engine and the thermoresponsive valve unit 12 is incorporated therein the cap member 27 partially extends through the circular aperture defined by the inner peripheral edge of the annular flange 15, and the inner peripheral edge of the flange 15 snuggly engages the outer surface of the cylindrical section 26, as shown in Figure 1. It will be noted that the bar 30 is provided with a pair of oppositely extending tabs 32 midway between its ends. The purpose of the tabs 32 will be pointed out hereinafter. It will also be noted that the lower end of the cap 27 of the end of the cylindrical section 26 opposite the wall 28 is flared outwardly and downwardly slightly to provide an annular inclined surface 34 which faces downwardly and inwardly. The inwardly facing surface 34 is spaced radially inwardly of the cylindrical section 23 and is vertically spaced above the upper edge 32 of the cylindrical section 23. In essence, the assembled cap 27, member 22, and the support member 16 define a casing.

Position on the top wall 28 over each opening 29 is a semi-circular plate-like valve member 35. Each valve member 35 has its straight edge provided with a pair of tabs 36 which are formed to substantially encircle a diametrically extending pivot pin 37 carried by the pivot pin bearings 31 of the cap member 27. Also mounted on the pivot pin 37 are a pair of coil springs 38, each of which has one end reacting against one of the valve members 35, its opposite end reacting against the other valve member 35 and an intermediate coiled portion encircling the pivot pin 37. It will be appreciated that the valve members are pivotal between a closed position, illustrated in Figure 3, and an open position, shown in Figure 5, and it will also be apparent that the spring 38 yieldably urged the valve members 35 to their closed position wherein fluid communication between the interior of the cap member 26 and the heat exchanger or radiator is disestablished. Those surface portions of the top wall 28 and the bar 30 defining the opening 29 serve as valve seats for the valve members 35.

Disposed within the space defined by the supporting member 16, member 22 and cap member 27 is a combination valve and valve actuator element 39. The element 39 is made of sheet metal or the like and is formed to have a frusto-conical shape, as best shown in Fig. 10. The normally lower edge or the edge defining the open end of the element 39 is curved slightly from the general plane of the cone-like wall 40 and is adapted to slidingly engage the inner surface 41 of the cylindrical section 23. The flat circular end 42 of the element 39 is in axial alignment with the thermo-responsive valve unit 12 and one end of the stem 21 is suitably secured thereto. When the thermo-responsive valve unit 12 is installed in an engine the chamber 43 defined by the support member 16 and the frusto-conical element 39 is filled with coolant flowing from the cylinder head casting 11 by virtue of the openings 17 coolant flows from the chamber 43 through a plurality of circumferentially-spaced openings 44 formed through the cone-shaped wall 40 of the element 39. The openings 44 are spaced radially inwardly of the depending cylindrical section 26 of the cap member 27 and are substantially in vertical alignment with the opening 29 formed through the top wall 28 of the cap member 27. Thus when the engine is first started and/or the coolant is below a predetermined temperature and the stem 21 of the thermostatic element 20 is in its contracted position as shown in Fig. 3, coolant being emitted through the openings 44 flows radially outwardly through the openings 33 to the space in the fitting 13 between the flange 15 and the cylinder head casting 11. Conduit means, not shown, are provided as in conventional installations for conveying coolant from the space 45 to the suction side of the engine water pump. Thus when the element 39 is in the position shown in Fig. 3 the engine heat exchanger or radiator is bypassed inasmuch as the semi-circular valve plates 35 are in their closed positions wherein the openings 29 are covered. The arrows indicated by numeral 46 illustrate the path taken by the coolant when the combination valve and valve actuator element 39 is in the positon shown in Fig. 3. When the temperature of the engine coolant reaches a predetermined value which corresponds to the proper operating condition for the engine, the stem 21 of the thermostatic element 20 moves to its expanded position as shown in Fig. 5. Inasmuch as the stem 21 is secured to the element 39 movement of the stem 21 from its contracted position to its expanded position effects vertical movement of the element 39 upwardly to a positon wherein an annular outer surface portion of the cone-shaped wall 40 of the element 39 engages the annular inclined surface 34 as shown in Fig. 5. Thus when the element 39 is in this position engine coolant can no longer flow from the chamber 43 to the space 45 inasmuch as the cone-shaped wall 40 and the inwardly facing surface 34 define an annular opening for providing fluid communication between the chamber 43 and the space 45 when the element 39 is in the position shown in Fig. 3, which opening is obviously closed when the element 39 is in its raised position and the cone-shaped surface 40 engages the inwardly facing surface 34. It will be appreciated that the inwardly facing surface 34 serves as a valve seat adapted to be engaged by the movable valve element 39. As stated hereinbefore, the element 39 not only functions as a movable valve member to control fluid communication between the space 45 and the cylinder head casting 11, but also serves as an actuator for moving the valve plates or members 35 to their open position whereby engine coolant can flow from the interior of the engine head casting 11 through the openings 17, 44 and 29 to the radiator or heat exchanger. This is accomplished by means of a pair of upright legs 46 which are suitably secured to the tapered wall 40 above the openings 44. The legs 46 project above the circular flat portion of the element 39 and when the thermostatic element 20 is in its contracted position the free terminal end of each leg 46 is adapted to abut a respective edge surface 48 of a tab 32 integrally formed with the bar 30. As the element 39 moves from its position shown in Fig. 3 to the position shown in Fig. 5, the inwardly facing surface 49 of each leg 46 slides upon the respective tab surface 48 and the terminal ends thereof move into engagement with the underside of the plate-like valve members 35 to pivot the same about the pivot pin 37 to their opened position, as shown in Fig. 5. The tabs 32 guide the element 39 as it slides vertically and also positions the element 39 to prevent cocking or canting of the same in use. From the foregoing it will be appreciated that fluid communication between the engine head casting 11 and the radiator bypass 45 is disestablished simultaneously when fluid communication is established between the engine head casting 11 and the radiator. The converse is also true, since the springs 38 move the plate-like valve members 35 to their closed positions when the element 39 moves vertically downwardly and away from seating engagement with the annular surface 34.

The embodiment of the invention chosen for the purposes of illustration and description herein is that preferred for achieving the objects of the invention and developing the utility thereof in the most desirable manner, due regard being had to existing factors of economy, simplicity of design and construction, production methods and the improvements sought to be effected. It will be appreciated, therefore, that the particular structural and functional aspects emphasized herein are not intended to exclude but rather to suggest such other modifications and adaptations of the invention as fall within the spirit and scope of the invention as defined in the appended claims.

What is claimed is:

1. In a coolant distribution system for an internal combustion engine and the like, the combination including a casing having an inverted cup-shaped cap provided with a coolant outlet opening in the top wall thereof, the lower end of the cylinder section of said cap defining an annular valve seat; a member secured to said cap having a second cylindrical section in axial alignment with and of greater diameter than said cap cylindrical section, a first valve member pivotally carried by said cap, said valve member being pivotal between a closed position wherein said valve member covers said outlet opening and engages said top wall in a coolant-sealing relationship and an open position wherein said outlet opening is uncovered, a plate-like second valve member having its entire outer peripheral edge slidably engaging the interior surface of said second cylindrical section in a coolant sealing relationship, said second valve member being slidable between a position wherein it engages said annular valve seat in a coolant-sealing relationship and a position wherein it is spaced from the lower end of said valve seat, said second valve member having a plurality of openings formed therethrough entirely within a circle of a diameter of said valve seat, and means carried by said second valve member adapted to pivotally open said first valve member when said second valve member is moved in coolant-sealing relationship with said annular valve seat.

2. In a coolant distribution system as set forth in claim 1, in which said casing includes a generally circular plate secured to the lower end of said second cylindrical section, said circular plate having a plurality of circumferentially-spaced openings formed therethrough, and a coolant temperature responsive means supported by said circular plate and operatively connected to said second valve member for sliding said second valve member in accordance with coolant temperature.

3. In a coolant distribution system for an internal combustion engine and the like the combination including a casing having an inverted cup-shaped cap provided with a coolant outlet opening in the top wall thereof, the lower end of the cylindrical section of said cap defining an annular valve seat, a member secured to said cap having a second cylindrical section in axial alignment with and of greater diameter than said cap cylindrical section, said casing having a plurality of outlet openings axially spaced below the top wall of said cap and radially between said cap and second cylindrical sections, a first valve member pivotally carried by said cap, said valve member being pivotal between a closed position wherein said valve member covers said outlet opening in said top wall and engages said top wall in a coolant sealing relationship and an open position wherein said outlet opening is uncovered, a plate-like second valve member having its entire outer peripheral edge slidably engaging the interior surface of said second cylindrical section in a coolant sealing relationship, said second valve member being slidable between a position wherein it engages said annular seat in a coolant sealing relationship and a position wherein it is spaced below said annular valve seat, said second valve member having a plurality of openings formed therethrough entirely within a circle of a diameter of said annular valve seat, and a leg secured to said second valve member and projecting upwardly therefrom, said leg being adapted to engage said first valve member and pivotally open the same when said second valve member is moved in coolant sealing relationship with said annular valve seat.

4. In a coolant distribution system as set forth in claim 3, in which, said casing includes a generally circular plate secured to the lower end of said second cylindrical section, said plate having a plurality of circumferentially spaced openings formed therethrough, and a coolant temperature responsive means supported by said plate and operatively connected to said second valve member for sliding said second valve member in accordance with coolant temperature.

5. In a coolant distribution system as set forth in claim 4, including spring means for biasing said first valve member to its closed position.

6. In a coolant distribution system for an internal combustion engine and the like the combination including a casing having an inverted cup-shaped cap provided with a pair of substantially semi-circular coolant outlet openings in the top wall thereof, the lower end of the cylindrical section of said cap defining an annular valve seat, a member having a second cylindrical section in axial alignment with and of greater diameter than said cap cylindrical section, a plurality of circumferentially spaced cylindrical section, a plurality of circumferentially spaced struts integrally formed with said second cylindrical section and extending axially upwardly and radially inwardly from the upper edge of said second cylindrical section, said struts being secured to said cap cylindrical section intermediate the ends thereof, a pair of first valve members pivotally carried by said cap, said first valve members being pivotal between a closed position wherein each of said valve members covers a respective semi-circular outlet opening and engages said top wall in a coolant sealing relationship and an opened position wherein said outlet openings are uncovered, a substantially frusto-conical shaped second valve member having its entire outer peripheral edge slidably engaging the interior surface of said second cylindrical section in a coolant sealing relationship, said second valve member being slidable between a position wherein it engages said annular valve seat in a coolant sealing relationship in a position wherein it is spaced from said annular valve seat, said second valve member having a plurality of openings formed therethrough entirely within a circle of a diameter of said cap cylindrical section, and means carried by said second valve member adapted to engage and pivotally open said first valve members when said second valve member is moved in coolant sealing relationship with said annular valve seat.

7. In a coolant distribution system as set forth in claim 6, in which, said casing includes a circular plate having its outer peripheral edge secured to the lower end of said second cylindrical section, said plate having a plurality of circumferentially spaced openings formed therethorugh, and an axially extending coolant temperature responsive means supported by said plate and operatively connected to said second valve member for slidably positioning said second valve member in accordance with coolant temperature.

8. In a coolant distribution system as set forth in claim 7, in which said means carried by said second valve member adapted to pivotally open said first valve member when said second valve member is moved in coolant sealing relationship with said annular valve seat includes a pair of radially spaced and parallel legs secured to said second valve member and projecting upwardly therefrom, each of said legs being adapted to engage the underside of a respective first valve member at a point spaced from the pivotal axis of the valve member whereby movement of said second valve member to its coolant sealing relationship position with said annular valve seat effects pivoting of said first valve members to their open positions.

9. In a coolant distribution system as set forth in claim 8, including spring means for biasing said first valve members to their closed positions.

10. In a coolant distribution system for an internal combustion engine and the like, the combination including a casing having an inverted cup-shaped cap provided with a pair of substantially semi-circular coolant outlet openings therethrough in the top wall thereof, said outlet openings being separated by a diametrically extending bar-like portion of said top wall, the lower end of the cylindrical section of said cap defining an annular valve seat, a first pair of plate-like valve members cooperable with said outlet openings, means for pivotally mounting said valve members on the top wall of said cap whereby each of said valve members is pivotal about a diametrically extending axis between a closed position wherein said valve member covers a respective outlet opening and engages said top wall in a coolant sealing relationship and an opened position wherein said outlet opening is uncovered, said means including a pivot pin supported by said top wall over said bar-like portion, the cylindrical section having a greater diameter than the cap cylindrical section, a plurality of circumferentially spaced struts integrally formed with and extending axially upwardly and radially inwardly from the uppermost edge of said second cylindrical section, the free ends of said struts being rigidly fixed to said cap cylindrical section intermediate the ends thereof whereby said second cylindrical section is in axial alignment with said cap cylindrical section, a substantially frusto-conically shaped second valve member having its entire outer peripheral edge engaging the interior surface of said second cylindrical section for vertical sliding movement and in a coolant sealing relationship therebetween, said second valve member being slidable between a position wherein it engages said annular valve seat in a coolant sealing relationship and a position wherein it is spaced axially below said annular valve seat, said second valve member having a plurality of openings formed therethrough entirely within a circle of a diameter of said cap cylindrical section, spring means encircling said pivot pin and reacting against said first valve members for yieldably urging said valve members to their closed positions, a pair of radially spaced legs fixed to and projecting upwardly from said second valve member, the free end of each of said legs being adapted to engage the underside of a respective first valve member to pivotally open said first valve member when said second valve member is moved in coolant sealing relationship with said cylindrical section, and guide means carried by said cap for engaging said legs for vertical sliding movement therebetween, said guide means preventing relative rotational movement between said second valve member and said casing.

11. In a coolant distribution system as set forth in claim 10, in which said guide means includes a pair of radially oppositely extending tabs integrally formed with said bar portion of said cap top wall, each of said tabs having an edge portion adapted to slidingly engage a flat surface of a respective leg.

References Cited in the file of this patent
UNITED STATES PATENTS

| | | |
|---|---|---|
| 1,413,371 | Adler | Apr. 18, 1922 |
| 1,528,786 | Purdy | Mar. 10, 1925 |
| 2,098,201 | Ward | Nov. 2, 1937 |
| 2,656,982 | Drapeau | Oct. 27, 1953 |
| 2,754,062 | Von Wangenheim | July 10, 1956 |